(12) United States Patent
    Liao

(10) Patent No.: US 12,477,185 B2
(45) Date of Patent: Nov. 18, 2025

(54) CONTENT DISPLAY METHOD AND APPARATUS

(71) Applicant: BEIJING BYTEDANCE NETWORK TECHNOLOGY CO., LTD., Beijing (CN)

(72) Inventor: Jianjun Liao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/042,200

(22) PCT Filed: Aug. 17, 2021

(86) PCT No.: PCT/CN2021/112886
§ 371 (c)(1),
(2) Date: Feb. 17, 2023

(87) PCT Pub. No.: WO2022/037552
PCT Pub. Date: Feb. 24, 2022

(65) Prior Publication Data
US 2023/0308723 A1    Sep. 28, 2023

(30) Foreign Application Priority Data

Aug. 19, 2020 (CN) .......................... 202010835637.8

(51) Int. Cl.
*H04N 21/472* (2011.01)
*H04N 21/2187* (2011.01)
(Continued)

(52) U.S. Cl.
CPC ....... *H04N 21/472* (2013.01); *H04N 21/2187* (2013.01); *H04N 21/43076* (2020.08); *H04N 21/437* (2013.01)

(58) Field of Classification Search
CPC ............. H04N 21/472; H04N 21/2187; H04N 21/43076; H04N 21/437; H04N 21/431;
(Continued)

(56) References Cited

U.S. PATENT DOCUMENTS

| 7,788,597 B1 | 8/2010 | Mazhar et al. |
| 2004/0114032 A1 | 6/2004 | Kakii et al. |

(Continued)

FOREIGN PATENT DOCUMENTS

| CN | 103841353 A | 6/2014 |
| CN | 105120301 A | 12/2015 |

(Continued)

OTHER PUBLICATIONS

Notice of Decision of Granting Patent Right for Invention issued Jul. 26, 2023 in Chinese Patent Application No. 202010835637.8, with English translation (9 pages).

(Continued)

*Primary Examiner* — Alazar Tilahun

(57) ABSTRACT

Provided are a content display method and apparatus, an electronic device, and a computer-readable storage medium. The method includes: displaying, on a first terminal, a first interface, the first interface being used to display a first content, and the first interface including a first control; and displaying, on the first terminal, a second interface and a third interface in response to receiving a trigger signal of the first control, the second interface being used to display the first content, and the third interface being used to display a second content collected by a second terminal and/or a third content collected by the first terminal.

16 Claims, 3 Drawing Sheets

(51) Int. Cl.
*H04N 21/43* (2011.01)
*H04N 21/437* (2011.01)

(58) Field of Classification Search
CPC ..... H04N 21/4788; G06F 9/451; G06F 16/44; G06F 16/74
See application file for complete search history.

(56) References Cited

U.S. PATENT DOCUMENTS

| | | | |
|---|---|---|---|
| 2008/0307324 | A1 | 12/2008 | Westen et al. |
| 2011/0296312 | A1 | 12/2011 | Boyer et al. |
| 2014/0108568 | A1 | 4/2014 | Lee |
| 2020/0244711 | A1* | 7/2020 | Engel ............... H04L 65/60 |
| 2021/0105512 | A1* | 4/2021 | Mertens ............ H04N 21/2187 |
| 2023/0011255 | A1* | 1/2023 | Tang ................. H04N 21/2668 |

FOREIGN PATENT DOCUMENTS

| | | |
|---|---|---|
| CN | 105426423 A | 3/2016 |
| CN | 105872705 A | 8/2016 |
| CN | 105872835 A | 8/2016 |
| CN | 106162236 A | 11/2016 |
| CN | 107333146 A | 11/2017 |
| CN | 110493473 A | 11/2019 |
| CN | 110673777 A | 1/2020 |
| CN | 110719416 A | 1/2020 |
| CN | 305631194 S | 2/2020 |
| CN | 107040457 A | 4/2020 |
| CN | 111010333 A | 4/2020 |
| CN | 111277884 A | 6/2020 |
| CN | 111385592 A | 7/2020 |
| CN | 112015506 A | 12/2020 |
| CN | 108933965 A | 6/2022 |
| KR | 101880156 B1 | 8/2018 |
| WO | 2019096307 A1 | 5/2019 |

OTHER PUBLICATIONS

Reexamination Decision issued Jun. 27, 2023 in Chinese Patent Application No. 202010835637.8, with English translation (2 pages).
International Search Report issued Oct. 26, 2021 in International Patent Application No. PCT/CN2021/112886, with English translation (8 pages).
First Office Action issued Feb. 22, 2022 in Chinese Patent Application No. 202010835637.8, with English translation (22 pages).
Second Office Action issued Oct. 8, 2022 in Chinese Patent Application No. 202010835637.8, with English translation (17 pages).
Rejection Decision issued Feb. 22, 2023 in Chinese Patent Application No. 202010835637.8, with English translation (16 pages).
Written Opinion for International Application No. PCT/CN2021/112886, mailed Oct. 26, 2021, 9 Pages.

* cited by examiner

CONTENT DISPLAY METHOD AND APPARATUS

CROSS-REFERENCE TO RELATED APPLICATIONS

The present application claims priority to Chinese patent application No. 202010835637.8, filed on Aug. 19, 2020 and entitled "CONTENT DISPLAY METHOD AND APPARATUS", the entire content of which is incorporated here by reference.

FIELD

The present disclosure relates to the field of content display technologies, and more particularly, to a content display method, a content display apparatus, and a computer-readable storage medium.

BACKGROUND

A new media short video, i.e., an instant music video emerging in recent years, is an Internet content propagation mode, and is generally a video having a time length within 5 minutes propagating on Internet new media. Along with popularization of mobile terminals and acceleration of network, a big-flow propagation content with short, adequate, and quick features gradually obtains the favor of various platforms, fans, and capitals.

Existing short video social interaction methods are usually comments, forwarding, likes, concern, etc. An exchange between users has non-real-time characteristics. A process of forwarding usually requires downloading, which occupies a certain period of time and has poor real-time interaction.

SUMMARY

The summary is provided to introduce concepts in a brief form. These concepts will be described in detail in the following detailed description of embodiments. The summary is not intended to identify key features or essential features of the claimed technical solutions, nor is it intended to be used for limiting the scope of the claimed technical solutions.

The technical problem to be solved by the present disclosure is to provide a content display method, aiming to at least partially solve a technical problem of poor real-time interaction in the related art. In addition, a content display apparatus, a content display hardware apparatus, a computer-readable storage medium, and a content display terminal are further provided.

In order to achieve the above purpose, according to an aspect of the present disclosure, the following technical solution is provided:

A content display method includes: displaying, on a first terminal, a first interface, the first interface being used to display a first content, and the first interface including a first control; and displaying, on the first terminal, a second interface and a third interface in response to receiving a trigger signal of the first control. The second interface is used to display the first content, and the third interface is used to display a second content collected by a second terminal and/or a third content collected by the first terminal.

In order to achieve the above purpose, according to an aspect of the present disclosure, the following technical solution is provided:

A content display apparatus includes: a first display module configured to display, on a first terminal, a first interface, the first interface being used to display a first content, and the first interface including a first control; and a second display module configured to display, on the first terminal, a second interface and a third interface in response to receiving a trigger signal of the first control. The second interface is used to display the first content, and the third interface is used to display a second content collected by a second terminal and/or a third content collected by the first terminal.

In order to achieve the above purpose, according to an aspect of the present disclosure, the following technical solution is provided:

An electronic device includes a memory configured to store a non-transitory computer-readable instruction, and a processor configured to run the computer-readable instruction to implement any content display method described above.

In order to achieve the above purpose, according to an aspect of the present disclosure, the following technical solution is provided:

A computer-readable storage medium is configured to store a non-transitory computer-readable instruction. The non-transitory computer-readable instruction, when executed by a computer, enables the computer to implement any content display method described above.

In order to achieve the above purpose, according to an aspect of the present disclosure, the following technical solution is provided:

A content display terminal includes any content display apparatus described above.

In the embodiments of the present disclosure, the first control is added to the first interface, and in response to receiving a trigger signal of the first control, the second interface and the third interface are displayed on the first terminal. Therefore, a content of the first terminal and a content of the second terminal can be shared and real-time interaction of users can be improved.

The above description is merely an outline of the technical solutions of the present disclosure. In order to more clearly understand the technical means of the present disclosure to realize implementations according to the content of the description and to make the above and other objects, features and advantages of the present disclosure more apparent and understandable, preferred embodiments will be described below with reference to the accompanying drawings.

BRIEF DESCRIPTION OF DRAWINGS

The above and other features, advantages, and aspects of each embodiment of the present disclosure will become more apparent in conjunction with the accompanying drawings and with reference to the following detailed description. Throughout the drawings, the same or similar reference numbers refer to the same or similar elements. It should be understood that the drawings are schematic, and components and elements are not necessarily drawn to scale.

DETAILED DESCRIPTION

Figure 1A:
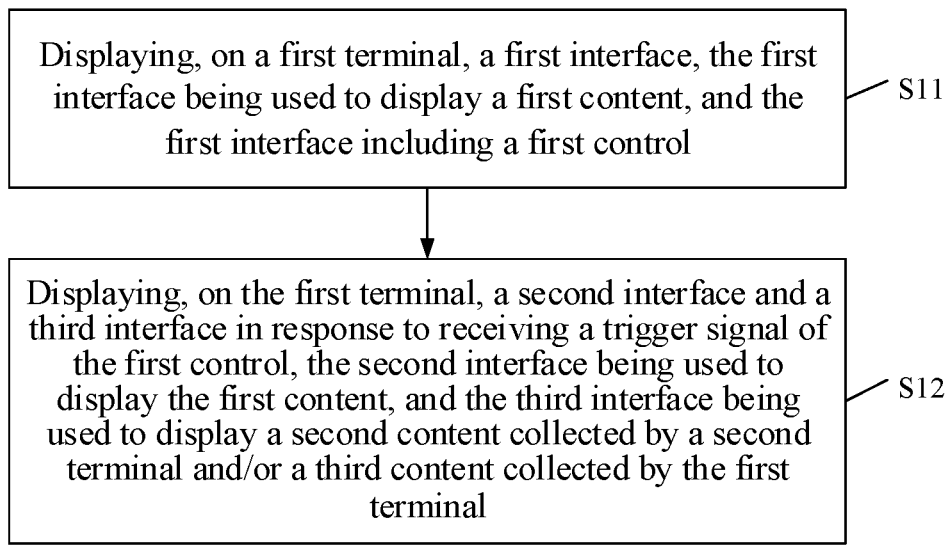
FIG. 1a is a schematic flowchart of a content display method according to an embodiment of the present disclosure.

Embodiments of the present disclosure will be described in more detail below with reference to the accompanying drawings. Although some embodiments of the present disclosure are shown in the drawings, it should be understood that the present disclosure can be implemented in various forms and should not be construed as being limited to the embodiments set forth herein. On the contrary, these embodiments are provided to facilitate a more thorough and complete understanding of the present disclosure. It should be understood that the accompanying drawings and embodiments of the present disclosure are only used for exemplary purposes, rather than to limit the protection scope of the present disclosure.

It should be understood that steps described in the method embodiments of the present disclosure may be executed in different sequences and/or in parallel. In addition, the method embodiments may include additional steps and/or omit executions of the illustrated steps. The scope of the present disclosure is not limited in the respect.

The term "include" and its variants as used herein indicate open-ended inclusions, i.e., "including but not limited to". The term "based on" refers to "at least partially based on". The term "an embodiment" means "at least one embodiment"; the term "another embodiment" means "at least one additional embodiment"; and the term "some embodiments" means "at least some embodiments". Related definitions of other terms will be given in the following description.

Embodiment 1

In order to solve a technical problem of poor real-time interaction in the related art, the embodiments of the present disclosure provide a content display method. As illustrated in FIG. 1a, the content display method mainly includes the following steps S11 to S12.

At step S11, a first interface is displayed on a first terminal. Here, the first interface is used to display a first content; and the first interface includes a first control.

Here, the first terminal may be a mobile terminal (for example, a smart phone, a tablet computer, etc.), or may also be a fixed terminal (for example, a desktop computer). In the first terminal, short video application software such as Tik Tok and AAuto Quicker may be installed. Correspondingly, the first interface may be a display interface corresponding to a single-player mode. The single-player mode is a mode allowing one person to watch a livestream. Correspondingly, the first content is a livestream content. The first control is associated with a multiplayer mode. The multiplayer mode is a mode allowing a plurality of persons to watch a same livestream content at the same time. The multiplayer mode may be initiated by triggering the first control. The first control may be a virtual button.

Figure 1B:
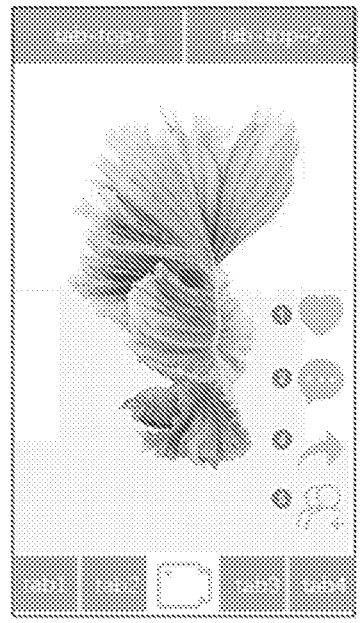
FIG. 1b is a schematic diagram of a first interface in a content display method according to an embodiment of the present disclosure.

Specifically, taking a short video application scenario as an example, as illustrated in FIG. 1b, an interface of a short video in the "single-player mode" includes functions "like" (e.g., an icon $\hat{1}$ in FIG. 1b), "comment" (e.g., an icon $\hat{2}$ in FIG. 1b), "forwarding" (e.g., an icon $\hat{4}$ in FIG. 1b), and an entry button of a "multiplayer mode", i.e., the first control (e.g., an icon $\hat{5}$ in FIG. 1b).

At step S12, a second interface and a third interface are displayed on the first terminal in response to receiving a trigger signal of the first control. Here, the second interface is used to display the first content, and the third interface is used to display a second content collected by a second terminal and/or a third content collected by the first terminal.

Here, the second terminal may be a mobile terminal (for example, a smart phone, a tablet computer, etc.), or may be a fixed terminal (for example, a desktop computer). In the second terminal, the short video application software such as Tik Tok and AAuto Quicker may be installed. Correspondingly, the first interface may be a display interface corresponding to the single-player mode. The single-player mode is the mode allowing one person to watch the livestream. Correspondingly, the second content is a livestream content.

Specifically, taking a short video application as an example, by triggering the first control by the user to generate the trigger signal, a plurality of display interfaces, i.e., the second interface and the third interface, are generated, a livestream content of the first terminal is displayed on the second interface, and another livestream content collected by the first terminal and/or another livestream content collected by at least one second terminal is displayed on the third interface.

In the embodiments of the present disclosure, the first control is added to the first interface, and in response to receiving a trigger signal of the first control, the second interface and the third interface are displayed on the first terminal. Therefore, a content of the first terminal and a content of the second terminal can be shared and real-time interaction of users may be improved.

In a first optional embodiment, the third interface includes a second control, and the third interface being used to display the second content collected by the second terminal includes: the second content collected by the second terminal being displayed in the third interface in response to receiving a trigger signal corresponding to the second control.

Here, the second control is associated with the second content. The second content is added into the third interface for display by triggering the second control. The second control may be a virtual button.

A display example of the second control is as illustrated in FIG. 1b, where the second content collected by the second terminal, for example, a livestream content, can be displayed by triggering the second control.

For example, taking the above-mentioned FIG. 1b as an example, the entry button of the "multiplayer mode" is clicked, the current user, i.e., the first terminal, becomes an "initiator", and the "multiplayer mode" is entered. After the clicking, the user is prompted to select an "invitee", i.e., the second terminal. The user may select a user from his/her friend list. After the selection is completed, the user clicks "OK" and transmits an invitation prompt to the selected "invitee". If the "invitee" is not online or rejects the invitation, the "single-player mode" is returned to; and if the "invitee" accepts the invitation, a next step is entered.

Figure 1C:
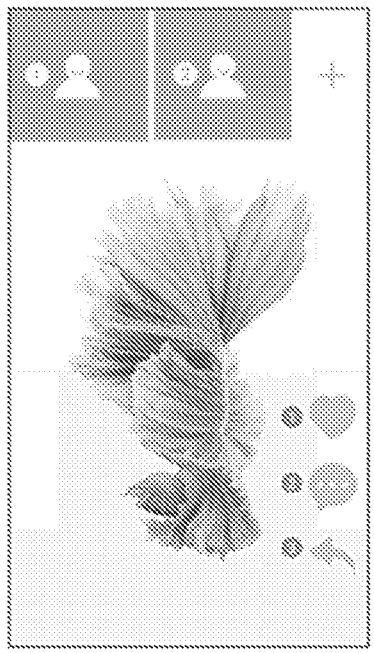
FIG. 1c is a schematic diagram of a third interface in a content display method according to an embodiment of the present disclosure.

In the "multiplayer mode", the tabs at the bottom in the "single-player mode" are hidden and unavailable. A video position is transferred from a centered position to the bottom. A "session window", i.e., the third interface, appears on the top. In the third interface, a real-time video window of a user added to a "session" is displayed (e.g., the user $\hat{1}$ and the user $\hat{2}$ in FIG. 1c, and both the "initiator" interface and the "invitee" interface are as illustrated in FIG. 1c).

In the "multiplayer mode", the "initiator" and "invitee" may further invite other users, which is realized by clicking an add button on a right side of the user's video window.

In a second optional embodiment, the method further includes steps S13 and S14 subsequent to the displaying, on the first terminal, the second interface and the third interface.

At step S13, a third control is displayed in the second interface.

Here, the third control may be a virtual button used to exit from the second interface and the third interface and return to the first interface.

At step S14, in response to triggering the third control, the first interface is displayed on the first terminal.

Figure 1D:
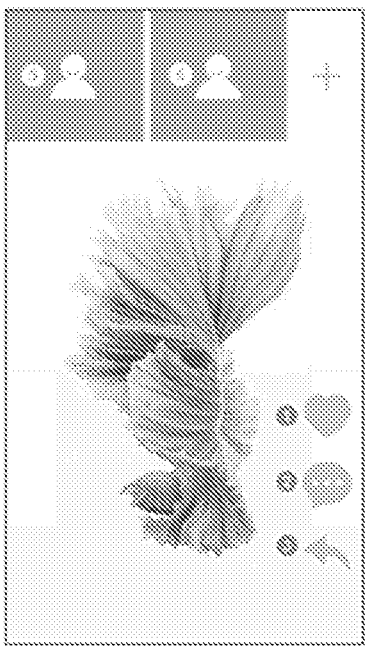
FIG. 1d is a schematic diagram of a third control in a content display method according to an embodiment of the present disclosure.

Specifically, a button "return to single-player mode", i.e., the third control, may be clicked to exit from the "multi-player mode" (e.g., an icon $\hat{3}$ in the lower part of FIG. 1d). The presence of the "session" will not be affected if the "invitee" exits from the "multiplayer mode". However, once the "initiator" exits from the "multiplayer mode", other participants exit too.

In a third optional embodiment, the step S12 specifically includes steps S121 and S122.

At step S121, a session request is transmitted in response to receiving the trigger signal of the first control.

Here, the session request includes an identifier of a user using the second terminal and an identifier of the first content.

At step S122, in response to the session request being accepted by the second terminal, the second interface and the third interface are displayed in the first terminal.

Specifically, the embodiment will be described in detail by taking the short video application scenario as an example. In the embodiment, the "multiplayer mode" is logically abstracted into the session, which is created by the "initiator", i.e., the first terminal, and into which the "invitee", i.e., the second terminal, is participated. The layout presented during this period is an up-down structure, as illustrated in FIG. 1c, where an entire interface is composed of a "session window" on the top, i.e., the third interface and a "short video window" below, i.e., the second interface.

Here, the "short video window" is used to display video stream data pushed by a short video platform. "Short video window" synchronization in a "session" process is mainly controlled by a "video synchronization center" in a server. Specifically, the "initiator" initiates a "session" invitation to the "video synchronization center"; the "video synchronization center" will create one "session", allocate a unique "session identifier" to the "session", and then transmit an invitation message, i.e., the session request, to the "invitee"; if the "invitee" is online and accepts the invitation, the "invitee" enters the "session", otherwise the "single-player mode", i.e., the first interface, is returned to. When the "invitee" enters the "session", the "invitee" applies to the "video synchronization center" to subscribe to a content of this session of the "initiator", including a "synchronous video signal" and a "status signal". The "synchronous video signal" uniquely identifies a short video played by the "initiator". The "status signal" indicates that an "initiator" video is in a "play" or "pause" status. The "initiator" is mainly responsible for collecting user operation and a video unique identifier and publishing data to the "video synchronization center" whiling carrying a "session identifier". After receives the data, the "video synchronization center" pushes the data to all "invitees" subscribing to the "session". The "invitee" is mainly responsible for receiving a signal transmitted from the "video synchronization center" and parsing video data and operation of the "initiator".

In a fourth optional embodiment, the method further includes: transmitting, by the first terminal, a synchronization control signal to a video synchronization center in response to receiving a display control signal for a first display content in the second interface.

Specifically, when the "invitee" enters the "session", a playing content of the "short video window" is controlled by a "synchronization video signal" and is kept synchronized with a content of the "initiator". After the "invitee" enters the "session", a playing progress of the first played video is not synchronized, and the video is played from the beginning. When the video is switched, a playing progress of a second short video is kept consistent with those of other participants in the "session". A playing status of the "short video window" is controlled by the "status signal", and the playing status includes two statues, i.e., "play" and "pause". When the "initiator" clicks on the screen to pause the video, the "video synchronization center" will transmit a "pause" signal to the "invitee", and the video of the "invitee" will automatically trigger the "pause". Similarly, when the "initiator" clicks a play button, the video of the "invitee" will also resume playing. In a same "session", only the initiator can control the play, pause, and switch of the short video. In the "session" process, the user may simultaneously obtain voice of the video and voice of the participant.

For example, based on the above embodiments, as illustrated in FIG. 1c, the entire interface is composed of the "session window" on the top and the "short video window" below. The two windows are both required to be synchronized. The "session window" shows real-time audio and video of other users in the same "session", is constructed based on User Datagram Protocol (UDP), and follows a Real Time Messaging Protocol (RTMP) standard to segment and encapsulate audio and video data, to realize synchronization of video and audio. the method of which is not limited here.

It should be understood by those skilled in the art that, based on the above embodiments, obvious variations (for example, superimposing listed modes) or equivalent replacement may be performed.

Hereinbefore, although various steps in content display method embodiments are described above in the order above, it should be apparent to those skilled in the art that the steps in the embodiments of the present disclosure are not necessarily executed in accordance with the above order, and may alternatively be executed in accordance with other orders like a reverse order, a parallel order, a crossed order, etc. Based on the above steps, those skilled in the art may add other steps. These manners with obvious variations or equivalent replacements should also be included within the protection scope of the present disclosure, and details thereof are not described herein.

The following are apparatus embodiments of the present disclosure. The apparatus embodiments of the present disclosure can be used for executing steps realized by method embodiments of the present disclosure. For simplification of illustration, only portions related to the embodiments of the present disclosure are illustrated. For the technical details, reference may be made to the method embodiments of the present disclosure.

Embodiment 2

Figure 2:
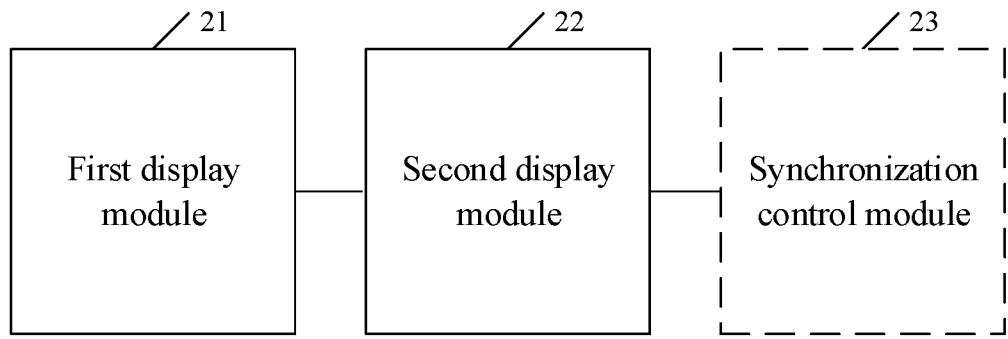
FIG. 2 is a schematic flowchart of a content display apparatus according to an embodiment of the present disclosure.

In order to solve the technical problem of poor real-time interaction in the related art, the embodiments of the present disclosure provide a content display apparatus. The apparatus can execute the steps in the content display method embodiments described in the above Embodiment one. As illustrated in FIG. 2, the apparatus mainly includes a first display module 21 and a second display module 22.

The first display module 21 is configured to display, on a first terminal, a first interface. Here, the first interface is used to display a first content, and the first interface includes a first control.

The second display module 22 is configured to display, on the first terminal, a second interface and a third interface in response to receiving a trigger signal of the first control. Here, the second interface is used to display the first content, and the third interface is used to display a second content collected by a second terminal and/or a third content collected by the first terminal.

Further, the third interface includes a second control. The third interface being used to display the second content collected by the second terminal includes: the second content collected by the second terminal being displayed in the third interface in response to receiving a trigger signal corresponding to the second control.

Further, the first display module 21 is further configured to display, in the second interface, a third control after the second interface and the third interface are displayed on the first terminal.

The second display module 22 is further configured to display, on the first terminal, the first interface in response to triggering the third control.

Further, the second display module 22 is specifically configured to: transmit a session request in response to receiving the trigger signal of the first control; and display, in the first terminal, the second interface and the third interface in response to the session request being accepted by the second terminal.

Further, the session request includes an identifier of a user using the second terminal and an identifier of the first content.

Further, the apparatus further includes a synchronization control module 23. The synchronization control module 23 is configured to: transmit, by the first terminal, a synchronization control signal to a video synchronization center in response to receiving a display control signal for a first display content in the second interface.

Further, the first interface is a display interface corresponding to a single-player mode.

Further, the first control is associated with a multiplayer mode.

For detailed description about the working principle and the realized technical effects, etc. of content display apparatus embodiments, reference may be made to related descriptions in the above content display method embodiments, and details are not described herein again.

Embodiment 3

Figure 3:
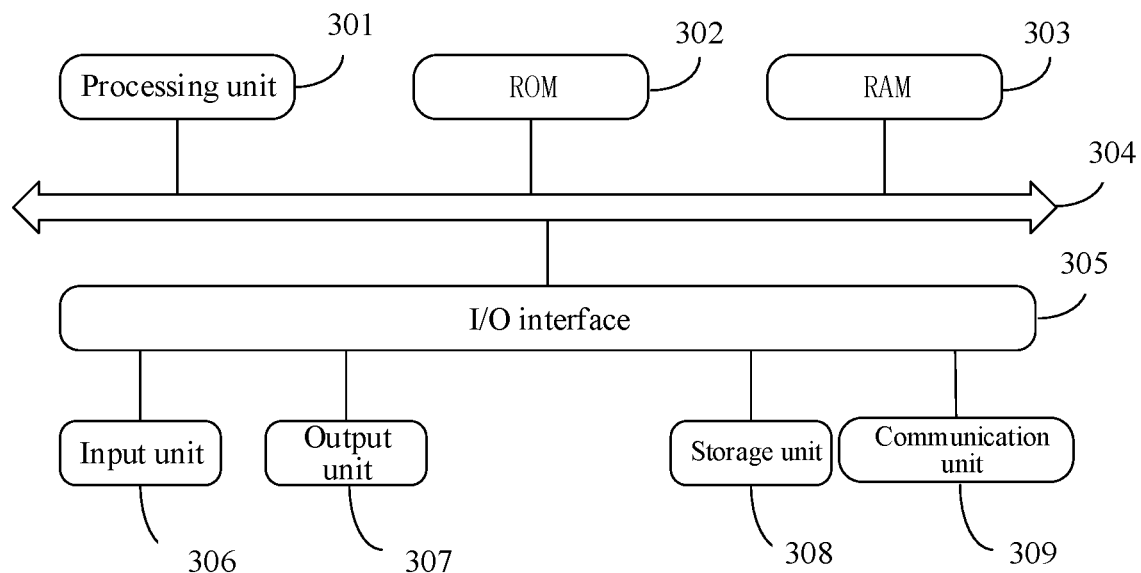
FIG. 3 is a schematic structural diagram of an electronic device according to an embodiment of the present disclosure.

Reference is now made to FIG. 3, which shows a structural schematic diagram of an electronic device 300 adapted to implement the embodiments of the present disclosure. The terminal device according to the embodiments of the present disclosure may include, but is not limited to, mobile terminals such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), and a fixed terminal such as a digital TV, a desktop computer, etc. The electronic device illustrated in FIG. 3 is exemplary only, and should not be construed as limiting the function and scope of use of the embodiments of the present disclosure.

As illustrated in FIG. 3, the electronic device 300 may include a processing unit (such as a central processing unit, a graphics processing unit, etc.) 301, which may perform various appropriate actions and processes in accordance with programs stored in a read only memory (ROM) 302 or loaded from a storage unit 308 into a random access memory (RAM) 303. In the RAM 303, various programs and data required for operation of the electronic device 300 may also be stored. The processing unit 301, the ROM 302, and the RAM 303 are connected to each other through a bus 304. An Input/Output (I/O) interface 305 is also connected to the bus 304.

Generally, the following units may be connected to the I/O interface 305: an input unit 306 including, for example, a touch screen, a touch pad, a keyboard, a mouse, a camera, a microphone, an accelerometer, a gyroscope, etc.; an output unit 307 including, for example, a Liquid Crystal Display (LCD), a speaker, an oscillator, etc.; the storage unit 308 including, for example, a magnetic tape, a hard disk, etc.; and a communication unit 309. The communication unit 309 may allow the electronic device 300 to perform wireless or wired communication with other devices for data exchange. Although FIG. 3 illustrates the electronic device 300 having various units, it can be understood that it is not necessary to implement or provide all the illustrated units. Alternatively, more or fewer units may be implemented or provided.

In particular, according to embodiments of the present disclosure, the process described above with reference to the flowchart may be implemented as a computer software program. For example, the embodiments of the present disclosure include a computer program product including a computer program carried on a non-transient computer-readable medium, the computer program including a program code for performing the method shown in the flowchart. In such an embodiment, the computer program may be downloaded and installed from a network via the communication unit 309 or installed from the storage unit 308 or from the ROM 302. When the computer program is executed by the processing unit 301, the above-described functions defined in the method of the embodiment of the present disclosure are performed.

It is to be noted that the above computer-readable medium in the present disclosure may be a computer-readable signal medium or a computer-readable storage medium or any superposition thereof. The computer-readable storage medium may be, but is not limited to, for example, an electrical, magnetic, optical, electromagnetic, infrared, or semiconductor system, apparatus, or device, or any superposition thereof. More specific examples of the computer-readable storage medium may include, but is not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a portable Compact Disc Read-Only Memory (CD-ROM), an optical storage device, a magnetic storage device, or any suitable superposition thereof. In the present disclosure, the computer-readable storage medium may be any tangible medium including or storing programs which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable superposition thereof. The computer-readable signal medium may be any computer-readable medium other than the computer-readable storage medium, and may transmit, propagate, or transfer programs used by or used with an instruction execution system, apparatus, or device. The program codes contained on the computer-readable medium may be transmitted via any appropriate medium, including but not limited to electric cables, optical cables, Radio Frequency (RF), etc., or any suitable superposition thereof.

In some embodiments, clients and servers may communicate using any currently known or future developed network protocol, such as HTTP (HyperText Transfer Protocol), and may be interconnected with digital data communications of any form or medium (e.g., communication networks). Examples of communication networks include a local area network (LAN), a wide area network (WAN), an internet (e.g., the Internet), and an end-to-end network (e.g., an ad hoc end-to-end network), as well as any currently known or future developed network.

The computer-readable medium may be contained in the electronic device, or may be present separately without being assembled into the electronic device.

The computer-readable medium carries one or more programs. The one or more programs, when executed by the electronic device, cause the electronic device to: display, on a first terminal, a first interface, the first interface being used to display a first content, and the first interface including a first control; and display, on the first terminal, a second interface and a third interface in response to receiving a trigger signal of the first control, the second interface being used to display the first content, and the third interface being used to display a second content collected by a second terminal and/or a third content collected by the first terminal.

Computer program codes for performing the operations of the present disclosure may be written in one or more programming languages, including, but not limited to, object-oriented programming languages such as Java, Smalltalk, C++, as well as conventional procedural programming languages such as the "C" language or similar programming languages. The program codes can be executed entirely on the user's computer, partly on the user's computer, as a separate software package, partly on the user's computer and partly on a remote computer, or entirely on a remote computer or server. In the case involving a remote computer, the remote computer may be connected to the user's computer through any kind of network, including a local area network (LAN) or a wide area network (WAN), or may be connected to an external computer (e.g., via the Internet using an Internet service provider).

The flowcharts and block diagrams in the drawings illustrate the architectures, functions, and operations of possible implementations of systems, methods, and computer program products according to various embodiments of the present disclosure. In this regard, each block in a flowchart or block diagram may represent a module, program segment, or part of codes that contains one or more executable instructions for performing a specified logical function. It should also be noted that, in some alternative implementations, the functions indicated in the blocks may alternatively occur in a different order than those indicated in the drawings. For example, two blocks presented in succession can actually be executed substantially in parallel or they can sometimes be executed in a reverse order depending on the functionality involved. It is also noted that each block in the block diagram and/or flowchart, and superpositions of the blocks in the block diagram and/or flowchart, may be implemented in a dedicated hardware-based system that performs a specified function or operation, or may be implemented in a superposition of dedicated hardware and computer instructions.

The units involved in the embodiments described in the present disclosure can be implemented in software or hardware. The name of the unit does not constitute a limitation on the unit itself under certain circumstances. For example, the first obtaining unit can also be described as "a unit for obtaining at least two Internet Protocol addresses".

The functions described above may be performed at least in part by one or more hardware logic components. For example, without limitation, exemplary types of hardware logic components that may be used include: Field Programmable Gate Array (FPGA), Application Specific Integrated Circuit (ASIC), Special Purpose Standard Product (ASSP), System on Chip (SOC), Complex Programmable Logic Device (CPLD), and the like.

In the context of the present disclosure, a machine-readable medium may be a tangible medium that may contain or store programs for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses or devices, or any suitable superposition thereof. A more specific example of the machine-readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable superposition of the above.

According to one or more embodiments of the present disclosure, provided is a content display method, including: displaying, on a first terminal, a first interface, the first interface being used to display a first content, and the first interface includes a first control; and displaying, on the first terminal, a second interface and a third interface in response to receiving a trigger signal of the first control, the second interface being used to display the first content, and the third interface being used to display a second content collected by a second terminal and/or a third content collected by the first terminal.

Further, the third interface includes a second control. The third interface being used to display the second content collected by the second terminal includes: the second content collected by the second terminal being displayed in the third interface in response to receiving a trigger signal corresponding to the second control.

Further, the method further includes, subsequent to said displaying, on the first terminal, the second interface and the third interface: displaying, in the second interface, a third control; and displaying, on the first terminal, the first interface in response to triggering the third control.

Further, said displaying, on the first terminal, the second interface and the third interface in response to receiving the trigger signal of the first control include: transmitting a session request in response to receiving the trigger signal of the first control; and displaying, on the first terminal, the second interface and the third interface in response to the session request being accepted by the second terminal.

Further, the session request includes an identifier of a user using the second terminal and an identifier of the first content.

Further, the method further includes: transmitting, by the first terminal, a synchronization control signal to a video synchronization center in response to receiving a display control signal for a first display content in the second interface.

Further, the first interface is a display interface corresponding to a single-player mode.

Further, the first control is associated with a multiplayer mode.

According to one or more embodiments of the present disclosure, provided is a content display apparatus including: a first display module configured to display, on a first terminal, a first interface, the first interface being used to display a first content, and the first interface including a first control; and a second display module configured to display, on the first terminal, a second interface and a third interface in response to receiving a trigger signal of the first control, the second interface being used to display the first content, and the third interface being used to display a second content collected by a second terminal and/or a third content collected by the first terminal.

Further, the third interface includes a second control, and the third interface being used to display the second content collected by the second terminal includes: the second content collected by the second terminal being displayed in the third interface in response to receiving a trigger signal corresponding to the second control.

Further, the first display module is further configured to display, in the second interface, the third control after the second interface and the third interface are displayed on the first terminal. The second display module is further configured to display, on the first terminal, the first interface in response to triggering the third control.

Further, the second display module is specifically configured to: transmit a session request in response to receiving the trigger signal of the first control; and display, in the first terminal, the second interface and the third interface in response to the session request being accepted by the second terminal.

Further, the session request includes an identifier of a user using the second terminal and an identifier of the first content.

Further, the apparatus further includes a synchronization control module configured to: transmit, by the first terminal, a synchronization control signal to a video synchronization center in response to receiving a display control signal for a first display content in the second interface.

Further, the first interface is a display interface corresponding to a single-player mode.

Further, the first control is associated with a multiplayer mode.

According to one or more embodiments of the present disclosure, provided is an electronic device, including: a memory configured to store a non-transitory computer-readable instruction; and a processor configured to run the computer-readable instruction to implement the content display method described above.

According to one or more embodiments of the present disclosure, provided is a computer-readable storage medium configured to store a non-transitory computer-readable instruction. The non-transitory computer-readable instruction, when executed by a computer, enables the computer to implement the content display method described above.

The above describes only preferred embodiments of the present disclosure and the technical principles employed. Those skilled in the art will appreciate that the scope of the present disclosure is not limited to technical solutions formed by specific superpositions of the above-mentioned technical features, but also encompasses other technical solutions formed by any superposition of the above-mentioned technical features or their equivalents without departing from the above-disclosed concepts, for example, technical solutions formed by replacing the above features with the technical features with similar functions disclosed in the present disclosure (but not limited thereto).

In addition, although the operations are depicted in a particular order, this should not be construed as requiring the operations to be performed in the particular order shown or in a sequential order. Under certain circumstances, multitasking and parallel processing may be beneficial. Likewise, although several specific implementation details are included in the above discussion, these should not be construed as limiting the scope of the present disclosure. Certain features described in the context of individual embodiments may also be implemented in superposition in a single embodiment. Conversely, the various features described in the context of a single embodiment may also be implemented in a plurality of embodiments individually or in any suitable sub-superposition.

Although the subject matter has been described in language specific to structural features and/or methodological logical actions, it should be understood that the subject matter defined in the appended claims is not necessarily limited to the particular features or actions described above. Rather, the particular features and actions described above are merely exemplary forms for implementing the claims.

What is claimed is:

1. A content display method, comprising:
   displaying a first interface corresponding to a single-player mode, wherein the first interface is configured to display a first content, and the first interface comprises a first control;
   displaying a second interface and displaying a third interface on a top part of the second interface in response to receiving a trigger on the first control to enter a multiplayer mode, wherein the second interface is configured to display the first content, and the third interface is configured to display a second content acquired by a second terminal and a third content acquired by a first terminal, wherein each of the first content, the second content and the third content is a livestream content; and
   continuously displaying the third interface on the top part of the second interface in response to the second terminal exiting from the multiplayer mode.

2. The method according to claim 1, wherein the third interface comprises a second control, and wherein the third interface being configured to display the second content acquired by the second terminal comprises:
   the second content acquired by the second terminal being displayed in the third interface in response to receiving a trigger corresponding to the second control.

3. The method according to claim 1, further comprising, subsequent to said displaying the second interface and displaying the third interface on the top part of the second interface:
   displaying, in the second interface, a third control; and
   displaying the first interface in response to triggering the third control to exit the multiplayer mode.

4. The method according to claim 1, wherein said displaying the second interface and displaying the third interface on the top part of the second interface in response to receiving the trigger on the first control to enter a multiplayer mode comprises:
   transmitting a session request in response to receiving the trigger of the first control; and
   displaying the second interface and displaying the third interface on the top part of the second interface in response to the session request being accepted by the second terminal.

5. The method according to claim 4, wherein the session request comprises an identifier of a user using the second terminal and an identifier of the first content.

6. The method according to claim 4, further comprising:
   transmitting, by the first terminal, a synchronization control signal to a video synchronization center in response to receiving a display control signal for a first display content in the second interface.

7. An electronic device, comprising:
   a memory configured to store a non-transitory computer-readable instruction; and
   a processor configured to run the computer-readable instruction to:
   display a first interface corresponding to a single-player mode, wherein the first interface is configured to display a first content, and the first interface comprises a first control;
   display a second interface and display a third interface on a top part of the second interface in response to receiving a trigger on the first control to enter a multiplayer mode, wherein the second interface is configured to display the first content, and the third interface is configured to display a second content acquired by a second terminal and a third content acquired by a first terminal, wherein each of the first content, the second content and the third content is a livestream content; and
   continuously display the third interface on the top part of the second interface in response to the second terminal exiting from the multiplayer mode.

8. A non-transitory computer-readable storage medium, configured to store a non-transitory computer-readable instruction, wherein the non-transitory computer-readable instruction, when executed by a computer, enables the computer to:
   display a first interface corresponding to a single-player mode, wherein the first interface is configured to display a first content, and the first interface comprises a first control;
   display a second interface and display a third interface on a top part of the second interface in response to receiving a trigger on the first control to enter a multiplayer mode, wherein the second interface is configured to display the first content, and the third interface is configured to display a second content acquired by a second terminal and a third content acquired by a first terminal, wherein each of the first content, the second content and the third content is a livestream content; and
   continuously display the third interface on the top part of the second interface in response to the second terminal exiting from the multiplayer mode.

9. The electronic device according to claim 7, wherein the third interface comprises a second control, and wherein the third interface being configured to display the second content acquired by the second terminal comprises:
   the second content acquired by the second terminal being displayed in the third interface in response to receiving a trigger corresponding to the second control.

10. The electronic device according to claim 7, wherein the processor is further configured to run the computer-readable instruction to, subsequent to said displaying the second interface and displaying the third interface on the top part of the second interface:
    display, in the second interface, a third control; and
    display the first interface in response to triggering the third control to exit the multiplayer mode.

11. The electronic device according to claim 7, wherein said displaying the second interface and displaying the third interface on the top part of the second interface in response to receiving the trigger on the first control to enter a multiplayer mode comprises:
    transmitting a session request in response to receiving the trigger of the first control; and
    displaying the second interface and displaying the third interface on the top part of the first terminal in response to the session request being accepted by the second terminal.

12. The electronic device according to claim 11, wherein the session request comprises an identifier of a user using the second terminal and an identifier of the first content.

13. The electronic device according to claim 11, wherein the processor is further configured to run the computer-readable instruction to:
    transmit, by the first terminal, a synchronization control signal to a video synchronization center in response to receiving a display control signal for a first display content in the second interface.

14. The non-transitory computer-readable storage medium according to claim 8, wherein the third interface comprises a second control, and wherein the third interface being configured to display the second content acquired by the second terminal comprises:
    the second content acquired by the second terminal being displayed in the third interface in response to receiving a trigger corresponding to the second control.

15. The non-transitory computer-readable storage medium according to claim 8, wherein the non-transitory computer-readable instruction, when executed by the computer, further enables the computer to, subsequent to said displaying the second interface and displaying the third interface on the top part of the second interface:
    display, in the second interface, a third control; and
    display the first interface in response to triggering the third control to exit the multiplayer mode.

16. The non-transitory computer-readable storage medium according to claim 8, wherein
    said displaying the second interface and displaying the third interface on the top part of the second interface in response to receiving the trigger on the first control to enter a multiplayer mode comprises:
    transmitting a session request in response to receiving the trigger of the first control; and
    displaying the second interface and displaying the third interface on the top part of the second interface in response to the session request being accepted by the second terminal.

* * * * *